United States Patent
Moussa et al.

(10) Patent No.: US 11,474,795 B2
(45) Date of Patent: Oct. 18, 2022

(54) STATIC ENFORCEMENT OF PROVABLE ASSERTIONS AT COMPILE

(71) Applicant: Apple Inc., Cupertino, CA (US)

(72) Inventors: Nader W. Moussa, Sunnyvale, CA (US); Etienne Belanger, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/128,459

(22) Filed: Sep. 11, 2018

(65) Prior Publication Data

US 2020/0081693 A1    Mar. 12, 2020

(51) Int. Cl.
*G06F 8/41*    (2018.01)

(52) U.S. Cl.
CPC ............... *G06F 8/42* (2013.01); *G06F 8/447* (2013.01)

(58) Field of Classification Search
CPC ....... G06F 8/00–78; G06F 11/36–3696; G06F 8/42; G06F 8/447
See application file for complete search history.

(56) References Cited

U.S. PATENT DOCUMENTS

| | | | |
|---|---|---|---|
| 7,243,090 B2 | 7/2007 | Kinzhalin et al. | |
| 7,389,495 B2 | 6/2008 | Wang et al. | |
| 8,302,092 B2 * | 10/2012 | Alverson | G06F 8/61 717/177 |
| 9,146,829 B1 * | 9/2015 | Allen | G06F 11/3632 |
| 9,436,582 B1 * | 9/2016 | Paruthi | G06F 11/3608 |
| 2005/0086648 A1 * | 4/2005 | Andrews | G06F 11/3608 717/135 |
| 2005/0251707 A1 * | 11/2005 | Alexander, III | G06F 11/3612 714/49 |
| 2007/0277163 A1 | 11/2007 | Avresky | |
| 2009/0077542 A1 * | 3/2009 | Chou | G06F 8/75 717/132 |
| 2010/0169868 A1 * | 7/2010 | Condit | G06F 8/437 717/136 |

(Continued)

OTHER PUBLICATIONS

Charlton, Nathaniel. "Verification of Java programs with interacting analysis plugins." Electronic Notes in Theoretical Computer Science 145 (2006): 131-150. (Year: 2006).*

(Continued)

*Primary Examiner* — Craig C Dorais
*Assistant Examiner* — Joanne G Macasiano
(74) *Attorney, Agent, or Firm* — Bakerhostetler

(57) ABSTRACT

Embodiments described herein provide for a non-transitory machine-readable medium storing instructions to cause one or more processors to perform operations processing, in an integrated development environment, a set of program code to identify an assertion within the set of program code; determining compile-time provability of a condition specified by the assertion; and presenting an error condition in response to failing to determine compile-time provability of the condition specified by the assertion, wherein determining compile-time provability of the condition specified by the assertion includes semantically converting the condition specified by the assertion into a Boolean, reducing the Boolean to an intermediate representation, and processing the intermediate representation to detect an expression within the intermediate representation that is non-constant at compile-time.

21 Claims, 10 Drawing Sheets

(56) References Cited

U.S. PATENT DOCUMENTS

| | | | | |
|---|---|---|---|---|
| 2014/0040865 A1* | 2/2014 | Li | ............................ | G06F 8/427 |
| | | | | 717/126 |
| 2014/0359572 A1* | 12/2014 | Yuen | .......................... | G06F 8/33 |
| | | | | 717/111 |
| 2017/0075787 A1* | 3/2017 | Muske | ........................ | G06F 8/75 |
| 2018/0107825 A1 | 4/2018 | Darbari | | |
| 2020/0042697 A1* | 2/2020 | Gauthier | .................. | G06F 21/52 |

OTHER PUBLICATIONS

Xie, Yichen, and Andy Chou. "Path sensitive program analysis using boolean satisfiability." Technical report (2002). (Year: 2002).*
Adrian Sampson et al., "Expressing and Verifying Probabilistic Assertions", Jun. 9-11, 2014, Edinburgh, UK, 11 pages.

\* cited by examiner

STATIC ENFORCEMENT OF PROVABLE ASSERTIONS AT COMPILE

FIELD

Embodiments described herein relate generally to integrated development environments. More specifically, embodiments related to an integrated development environment that provides static and compile-time enforcement of provable assertions.

BACKGROUND OF THE DESCRIPTION

In conventional programming languages, assertions are used to perform runtime checks of assumptions about system state during the execution of program code. An assert statement can be placed into program code. When the assert statement is executed, a check as to the truth of a Boolean statement is performed. If the condition is true, no operations are performed as a result of the assert statement. If the condition is false, the assert statement immediately terminates the program. The assert statement enables programmers to impose conditions that are assumed to be true at the point of the assertion statement. If those assumptions fail, the continued execution of the program may not be safe.

SUMMARY OF THE DESCRIPTION

Embodiments described herein provide an integrated development environment that includes a compiler and analyzer toolchain that evaluates assertion statements within program code. Assertion statements assert the truth of a Boolean condition, which may be a simple value or expression or may be a Boolean-logic composition of multiple values or expressions. The toolchain of the integrated development environment is configured to determine if the asserted condition of the assertion statement is statically provable at compile-time. A condition is statically provable if and only if every element of a composition of multiple values can be resolved to a constant value at compile-time, or the set of potential values of any non-constant values or expression within the condition can be determined to be sufficiently constrained.

One embodiment provides for a non-transitory machine-readable medium storing instructions to cause one or more processors to perform operations processing, in an integrated development environment, a set of program code to identify an assertion within the set of program code, determining compile-time provability of a condition specified by the assertion, and presenting an error condition in response to failing to determine compile-time provability of the condition specified by the assertion. Determining compile-time provability of the condition specified by the assertion includes semantically converting the condition specified by the assertion into a Boolean, reducing the Boolean to an intermediate representation, and processing the intermediate representation to detect an expression within the intermediate representation that is non-constant at compile-time.

One embodiment provides for a data processing system comprising a memory to store instructions for processing and one or more processors to execute the instructions. The instructions, when executed, cause the data processing system to perform operations comprising processing, in an integrated development environment, a set of program code to identify an assertion within the set of program code, determining compile-time provability of a condition specified by the assertion, and presenting an error condition in response to failing to determine compile-time provability of the condition specified by the assertion, wherein determining compile-time provability of the condition specified by the assertion includes semantically converting the condition specified by the assertion into a Boolean, reducing the Boolean to an intermediate representation, and processing the intermediate representation to detect an expression within the intermediate representation that is non-constant at compile-time.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1A:
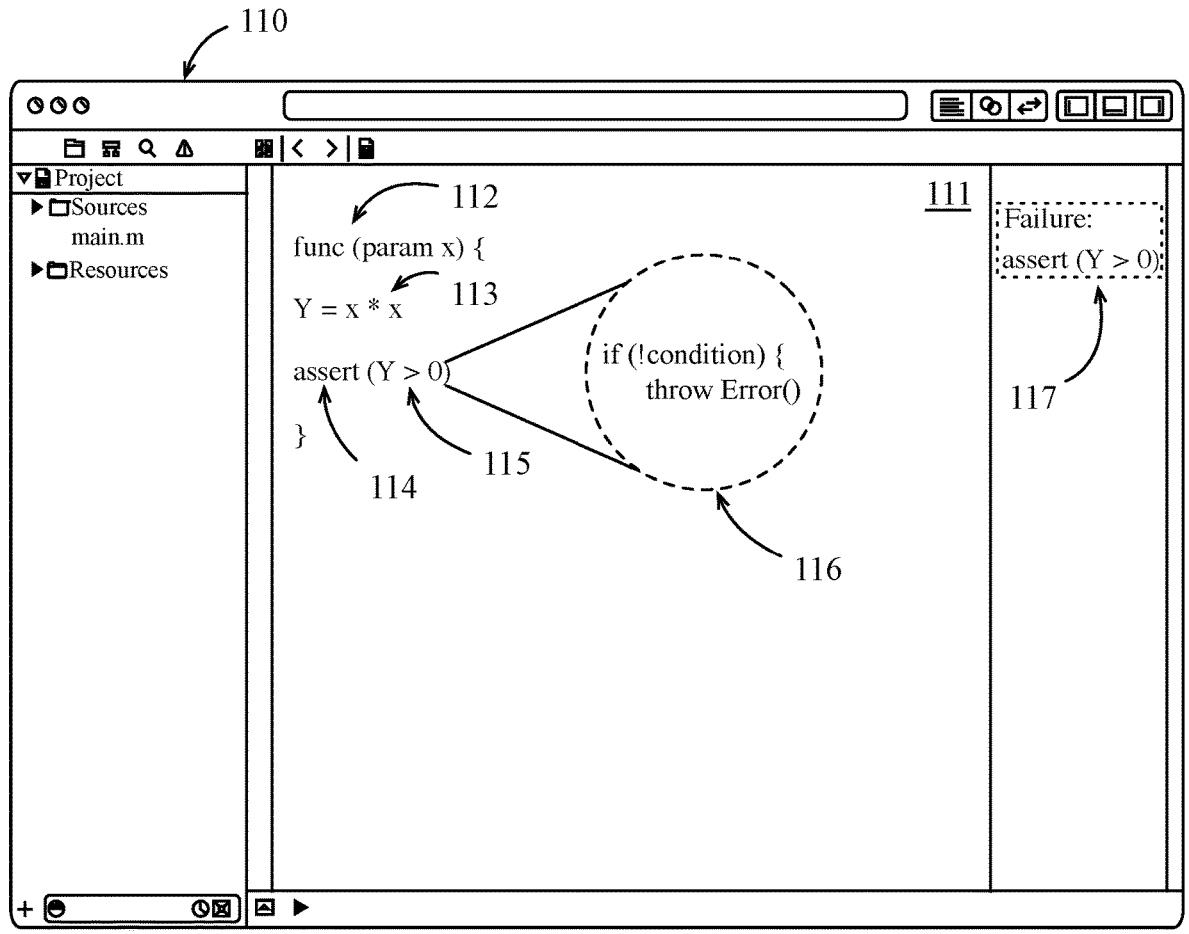
FIG. 1A-1B illustrate an integrated development environment configured for static enforcement of provable assertions at compile-time, according to an embodiment.

Assertions can be used in a variety of situations during the development of a software program and, in some instances, may also be included within production program code. Assertions can be used to verify internal invariants within program code or to verify logical preconditions and/or postconditions for a function or block of program code. An invariant is a condition that can be relied upon as true during the execution of a block of program code. Preconditions for program code include bounds on the logical state that is assumed to be in effect before a function, method, or block of code is to be executed. Postconditions for program code include bounds on the logical state that is assumed to be in effect after function, method, or block of code is executed.

The use of assertions should be limited to conditions that will always be true during runtime. Should an assertion fail, the results of program termination may be severe, as a failed assertion results in the immediate termination of an executing program. However, during program development, some developers may improperly use assertions to check runtime conditions with statements that may evaluate to false during program execution, even if such occurrence may be extremely rare. Should an assertion failure condition occur, the immediate termination of the program code will result. If the assertion failure is rare, the program may survive testing without issue, only to fail unexpectedly in real-word scenarios. Accordingly, in some software development systems, it may be desirable to prevent the use of assertion statements unless those statements can be statically proven at compile-time.

Embodiments described herein pertain to the design of software programming languages and to the compiler that translates a programming language into executable program-code. One embodiment provides for a compiler of a software programming language to enforce the provability of an assertion at compile-time. Techniques described here enhance the programming language arts by enabling the enforcement of "provability criterion" for any assertion. If the assertion is not provable, the compiler will report an error to the programmer at compile-time instead of allowing an unproven assertion to persist in the software program. Enforcement of static provability improves discoverability of error conditions and prevents a malformed assertion from causing unexpected runtime errors. If the programmer wishes to run the program code, the programmer can either rewrite the software so that the assertion can be statically proven or the programmer can remove the assertion. In addition to a compiler, one embodiment provides for an analysis toolchain that can also be used to evaluate the provability of the assertion based on static analysis of program code. In one embodiment the compiler and analysis toolchain can work together to enable cross-module verification of assertions.

Assertion statements assert the truth of a Boolean condition, which may be a simple value or expression or may be a Boolean-logic composition of multiple values or expressions. A condition is statically provable if and only if every element of a composition of multiple values can be resolved to a constant value at compile-time. In one embodiment, a compiler can implement such check by semantically converting the condition specified by the programmer into a Boolean statement, reducing the Boolean statement to an abstract syntax graph, tree, or another intermediate representation, and traversing an abstract syntax graph or tree using a spanning graph traversal algorithm. In one embodiment, the compiler can perform a depth-first search to traverse an abstract syntax tree until a terminal graph node (e.g., leaf node) is discovered that is non-constant at compile-time. The compiler can be configured to enable early termination of the graph search when a non-constant node is found, as the non-constant node indicates that the programmer has represented an unprovable assertion.

In one embodiment, the compiler can present a human-readable error-statement that clearly specifies the contents of the non-constant leaf-node discovered during graph traversal, providing an easy-to-interpret method for the programmer to fix the non-provability condition. In one embodiment, an optimization is provided that enables the re-use of previously-proven assertions during a run of the compiler. The compiler tool can maintain a cached list of previously-evaluated graph traversals that have been found to be statically-provable.

One embodiment provides a technique in which a programmer can temporarily specify a Boolean logic predicate expression that is proven using external methods or the truth of which is being asserted by a developer. The enhancement can be implemented in the firm of a locally-scoped compiler directive that allows the programmer to specify truth-value for a predicate in an assertion condition. One embodiment provides for an assert-verify paradigm in which a programmer can assert the truth of a value and a later verify statement can be used to verify a condition that at least in part includes the previously asserted value.

In various aspects of the embodiments described herein, "compiler" and "analyzer" are used interchangeably, where both terms represent a software tool that translates a high-level language representation into an abstract syntax representation. In one embodiment, a compiler and analyzer toolchain are provided in which some elements of the concepts described herein are implemented by a compiler and other elements are implemented by an analyzer. For example, a compiler can perform compile-time verification of assertions within a programming language module, while an analyzer can verify assertions based on cross-module statements. In one embodiment, Boolean logic predicates can be provided to a compiler by an analyzer to assist the compiler in the verification of assertions. Additionally, different portions or modules of a modular compiler can provide results of compile-time verification of assertion statements to other portions or modules of the modular compiler.

Figure 1B:
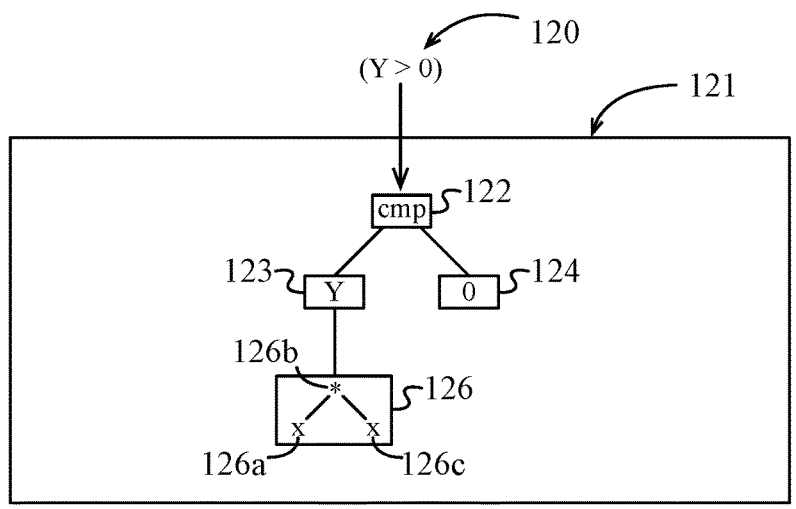

FIG. 1A-1B illustrate an integrated development environment configured for static enforcement of provable assertions at compile-time, according to an embodiment. FIG. 1A illustrates a user interface 110 for an integrated development environment (IDE). FIG. 1B illustrates analysis of Boolean condition of an assertion statement to determine compile-time provability of the assertion statement.

As shown in FIG. 1A, an IDE is provided having a user interface 110 into which files that include software code and/or program statements can be browsed and edited by a programmer. The user interface 110 includes an editor 111 that can be used to inter or edit program code or software statements. In addition to the user interface 110, the IDE includes a compiler and/or an interpreter, build automation tools, a code analyzer, and a debugger. Examples of IDEs include the Xcode IDE from Apple Inc. of Cupertino, Calif., and the Visual Studio IDE from Microsoft Corp. of Redmond, Wash. Other IDEs are known to those of skill in the art.

The user interface 110 includes an editor that includes features that facilitate viewing and editing text (e.g., source code, XML, etc.) and/or graphical content (e.g., representations of programming components such as data models or graphical user interface (GUI) components). The editor also includes features that facilitate moving between files and accessing related reference materials (e.g., an application programming interface (API) definition).

Some types of IDEs provide software development capabilities for a specific programming language and have a feature set that is tightly coupled to the programming paradigm for the specific programming language. Other types of IDEs, such that the IDE provided by embodiments described herein, include support for multiple programming languages. Support for multiple programming languages allows a single IDE to be used to develop software for multiple projects spanning multiple programming languages and/or multiple platform, instead of using one IDE per programming language.

In the figures and accompanying description, program code statements are used to illustrate concepts of the embodiments. However, those program code statements are not intended to be specific as to any one programming language or programming paradigm. The concepts described herein can be generally applied to a variety of programming languages for a variety of platforms. Furthermore, the concepts can be implemented within a variety of different types of integrated development environments, compiler toolchains, or static analyzers, as described in further detail below.

The editor 111 can display or receive entry of a program statement, such as a declaration of a function 112. The function 112 can include program code that can be compiled by a compiler for execution on a target platform. As illustrated, the function 112 includes a program statement 113 and an assertion statement 114. The assertion statement 114 includes a condition 115 that is asserted to be true by the assertion statement 114. Example logic to evaluate the assertion statement 114 and condition 115 is shown by program statement 116, where if the provided condition 115 is not true, the program will throw or trigger an error, which immediately halts the execution of the program. Assertions differ from exceptions in that the failure of an assertion should not be caught and handled, as the assertion failure may indicate that the program code is in a state where continued execution may result in data corruption or another outcome that is less favorable than the immediate termination of the program.

Because of the severe results of an assertion failure, embodiments described herein provide for an IDE having compile-time logic to enforce the static provability of assertion statements at compile-time. If the assertion statement 114 cannot be determined to be true for all possible runtime conditions, the compiler will display an error message 117 via the user interface 110. The error message 117 can indicate the specific assertion statement and condition that failed. For complex assertion statements, the error message 117 can indicate which portion of the assertion statement cannot be statically verified.

For example, program statement 113 is a mathematical statement that sets the variable Y to the product of x*x, where x is a parameter of the function 112. The assertion statement 114 asserts the condition 115 that Y is greater than zero. FIG. 1B illustrates analysis of the assertion statement 114, as performed in one embodiment.

As shown in FIG. 1B, in one embodiment the condition 115 of the assertion statement 114 is evaluated as a Boolean statement 120. The Boolean statement 120 is analyzed to determine if such statement is statically provable. The Boolean statement 120 can be converted into an intermediate representation of the statement. In one embodiment, the analysis of the intermediate representation can be performed by generating an abstract syntax tree 121 based on the intermediate representation. The abstract syntax tree 121 is a logical structuring of the intermediate representation of the Boolean statement 120. The abstract syntax tree 121 can include an operation 122 to be performed, with the set of inputs (e.g., first input 123, second input 124) arranges as child nodes of the operation 122. The operation 122 of the abstract syntax tree 121 of the Boolean statement 120 (Y>0) includes a compare operation that is evaluated based on a first input 123 (Y variable) and a second input 124 (immediate value zero). The second input 124 is a constant, so the value of the second input is known at compile-time. The first input 123, however, is a variable that may be non-constant at compile-time.

The value of the first input 123 (variable Y) is determined based on an expression 126, which is a mathematical expression (x*x). In one embodiment, a further evaluation of the expression 126 can be performed to determine if, at the least, a constraint on the value of the first input 123 can be determined. The further evaluation of the expression 126 determines that the value of the variable Y is based on a multiply operation 126b having input 126a and input 126c, where each input is function parameter x.

Given this scenario, the compiler may or may not have sufficient data regarding the potential values of x to determine that it is provable, at compile-time, that the truth of the Boolean statement 120 (Y>0) can be determined, for example, based on the potentially unknown value of x, which is a parameter to the function 112 that contains the assertion statement 114. For example, if the value of x is in any way related to an input from a source external to the program, the value of x may be unconstrained. Alternatively, the value of x may be determined based on program code in different program module as the function 112, and that value may be out of the scope of values that can be determined during compilation of the program module that contains the function 112. In such scenarios, an error message 117 may be generated and displayed to the programmer that indicates that the assertion statement is not statically provable by the compiler. Alternatively, if the value of x is determined by program code within the same program module (e.g., file, library, etc.) as the function 112, it may be possible for the compiler to determine the value of x or at least a constraint on the value of x. In one embodiment, a value of x or a constraint on the value of x may be provided by another module of the compiler or from a program code analyzer that is executing concurrently with the compiler.

In some embodiments, even if one or more individual values associated with a condition 115 are unknown, some constraints can be determined based on the operation 126b that is evaluated. For example, the expression 126 includes a multiply operation 126b having inputs 126a, 126c that are identical. Accordingly, the expression 126 can be evaluated to determine that the set of all potential outputs are greater than or equal to zero for any input value x. Were the condition 115 was instead (Y>=0) rather than simply (Y×0), the truth of the condition could be determined statically and the assertion would be allowed without triggering an error.

Thus, for at least one embodiment described herein, the assertion evaluation logic can be configured to determine if all inputs that determine the value of the Boolean associated with an assertion statement are constant at compile-time, then if all inputs cannot be determined to be constant, the assertion evaluation logic can then determine if constraints exist on the constituent expressions of the condition that allow the provability of the condition to be statically determined.

The Boolean statement 120 illustrated is a relatively simple statement and is shown for descriptive and exemplary purposes. However, the conditions of assertion statements to be evaluated may be exceedingly complex. Complex assertion statements may be difficult to craft and error check. In some program code implementations, such as program code that implements computer vision algorithms, portions of the program code may be the result of machine generated and produced as the result of a complex, iterated upper level of software. For such program code, the values of some of the variables are not necessarily human readable or understandable, potentially necessitating a toolchain-based mechanism to verify the provability of assertions having conditions that can be traced back to automatically generated program code.

Figure 2A:
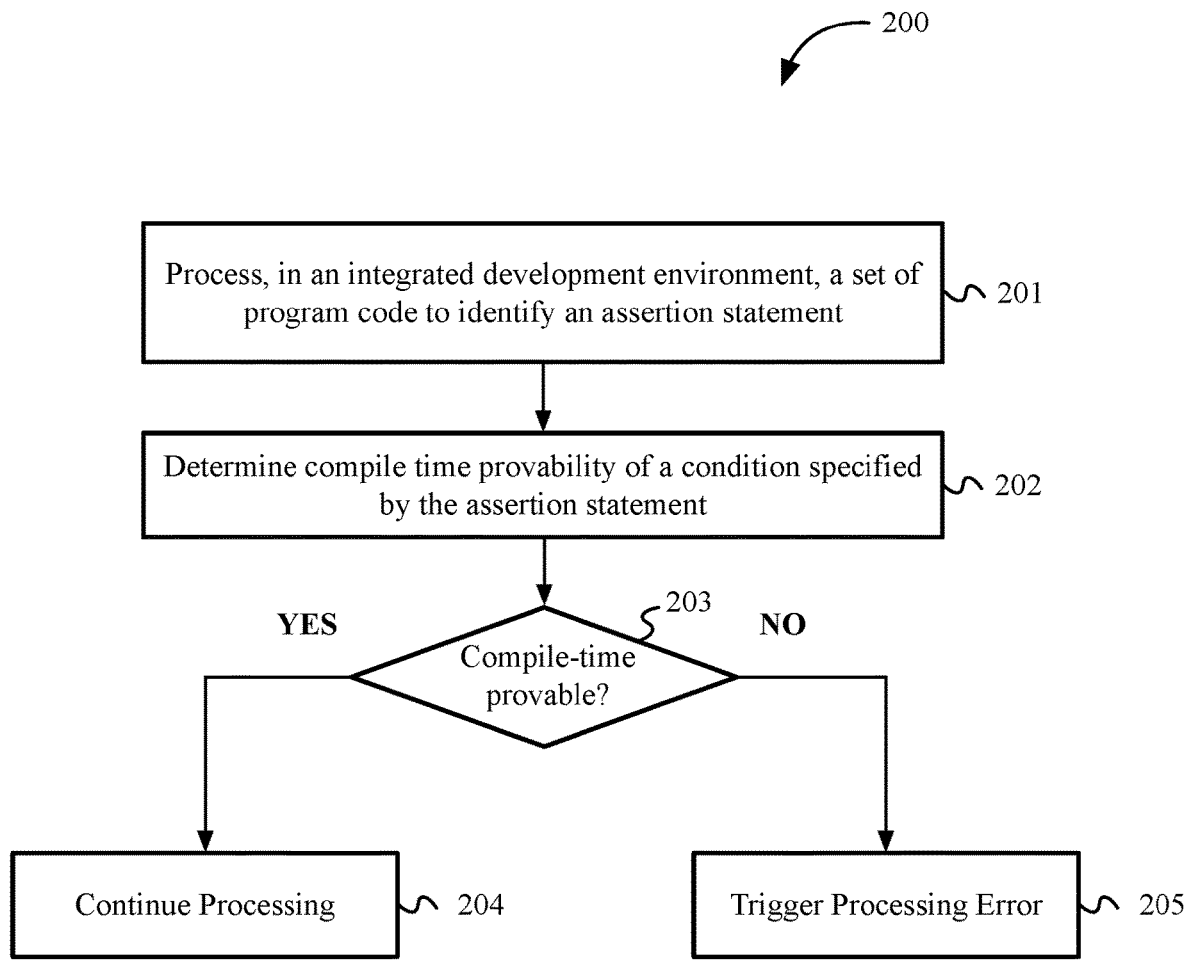
FIG. 2A-2B illustrate methods to process program code and determine static provability of assertion statements found therein.
Figure 2B:
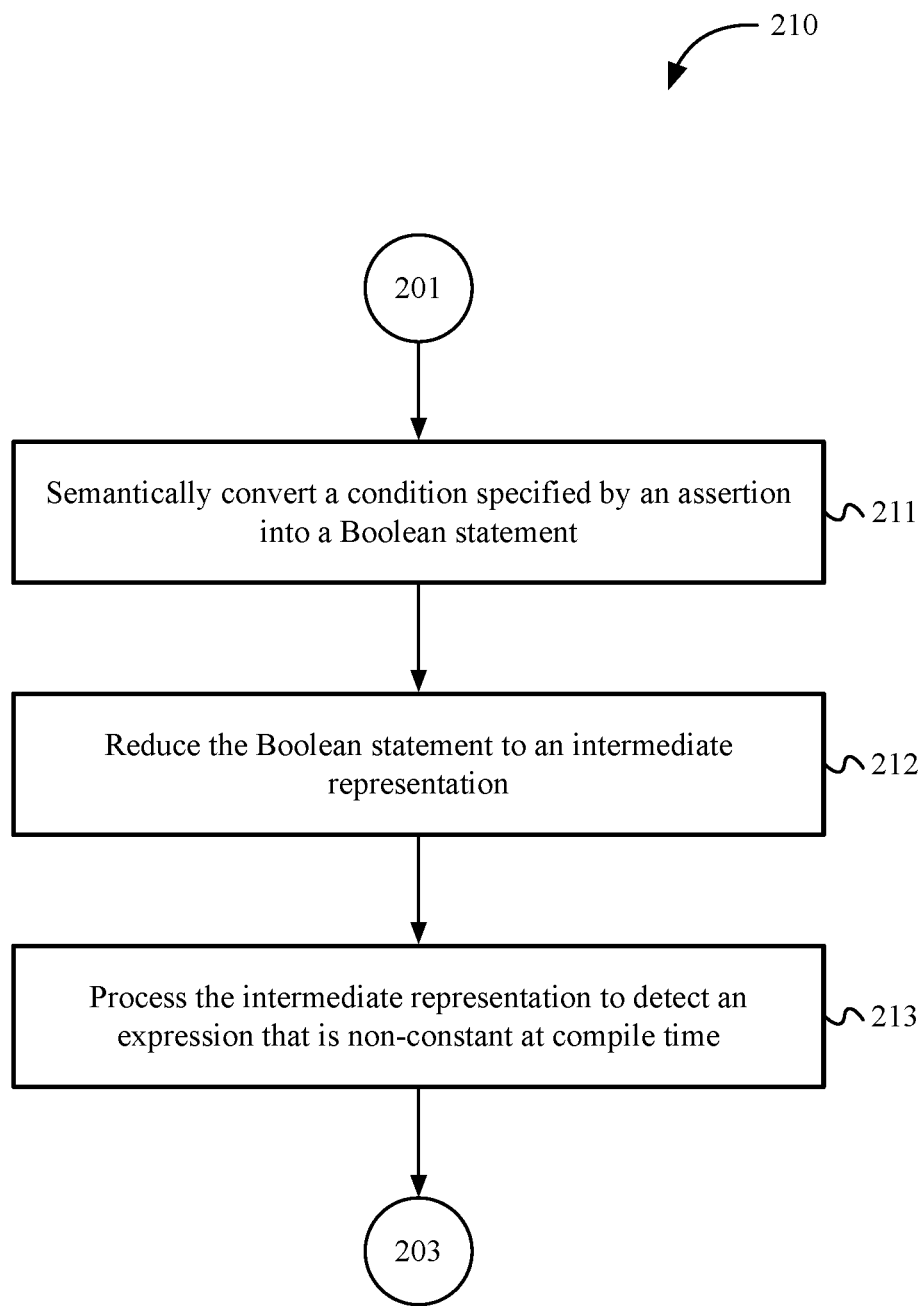

FIG. 2A-2B illustrate methods 200, 210 to process program code and determine static provability of assertion statements found therein. FIG. 2A illustrates method 200, which is a generalized method of evaluation that can be applied by embodiments described herein. FIG. 2B illustrates method 210, which is a more specific method of evaluation, according to embodiments described herein. The operations of method 200, 210, and other methods described herein can be performed via processing logic that includes hardware (e.g. circuitry, dedicated logic, etc.), software (as instructions on a non-transitory machine-readable storage medium), or a combination of both hardware and software. Although sequential operations are illustrated, it should be appreciated that some of the operations described may be performed in a different order. Moreover, some operations may be performed in parallel rather than sequentially. Additionally, some operations may be indicated as optional and are not performed by all embodiments.

As shown in FIG. 2A, method 200 includes operation 201, which processes, in an integrated development environment, a set of program code to identify an assertion statement. Method 200 further includes operation 202, which determines the compile-time provability of a condition specified by the assertion statement. If method 200 determines that the condition specified by the assertion statement is compile-time provable, as shown at block 203, the method 200 continues to operation 204, which continues processing the set of program code. Otherwise, the method 200 can perform operation 205 to trigger a processing error. Method 200 can be performed by a compiler of an IDE or, in various embodiments, a static analyzer associated with the IDE or a combination of the compiler and static analyzer. In one embodiment, a static analyzer can analyze the set of program code during or in association with compilation of the program code by a compiler or compiler toolchain. In one embodiment, complex assertion statements can be divided into multiple portions, with some portions evaluated by the compiler and other portions evaluated by the analyzer. In one embodiment, a programmer can include compiler directives within program code that explicitly declares the truth of one or more portions of an assertion statement.

Method 210 illustrates operations that can be used to evaluate the static provability of assertion statements found in program code. Method 210, in one embodiment, is used to determine the compile-time provability of the condition specified by the assertion statement, which is performed during operation 202. As shown in FIG. 2B, method 210 includes operation 211, which can be performed after operation 201 of method 200. Operation 211 includes to semantically convert a condition specified by an assertion into a Boolean statement. Method 210 additionally includes operation 212, to reduce the Boolean statement to an intermediate representation. The Boolean statement can include multiple expressions that may be able to be evaluated separately. For example, with reference to FIG. 1B, Boolean statement 120 includes an expression including a comparison (e.g., operation 122). The second input 124 is an immediate having a constant value, while the first input 123 is a variable having a value dependent upon an expression 126 that includes a multiply operation 126b having multiple inputs 126a, 126c.

Method 210 continues to operation 213, to process the intermediate presentation to detect an expression that is non-constant at compile-time. In one embodiment, the presence of a non-constant expression within the evaluation chain for the assertion condition can be provided as input to block 203, where method 200 determines whether or not the assertion statement is provable at compile-time. Specifically, if all values used to evaluate the condition are constant at compile-time, the assertion can be stated to be statically provable at compile-time. However, if one or more non-constant values are determined it still may be possible to statically prove the assertion depending on the types of operations that are performed during evaluation of the assertion condition.

Figure 3A:
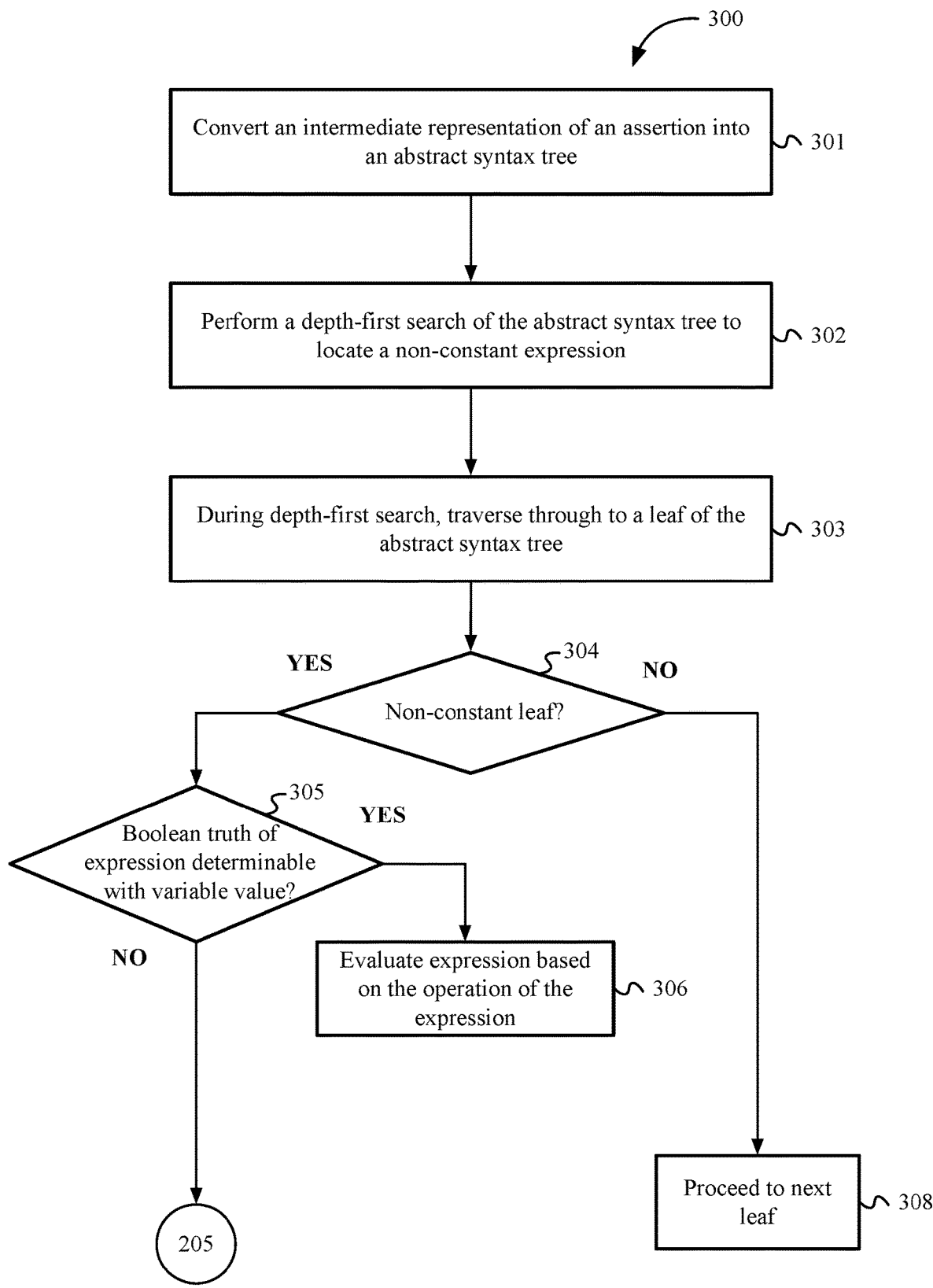
FIG. 3A-3B illustrate additional methods that can be used to evaluate the static provability of an assertion.
Figure 3B:
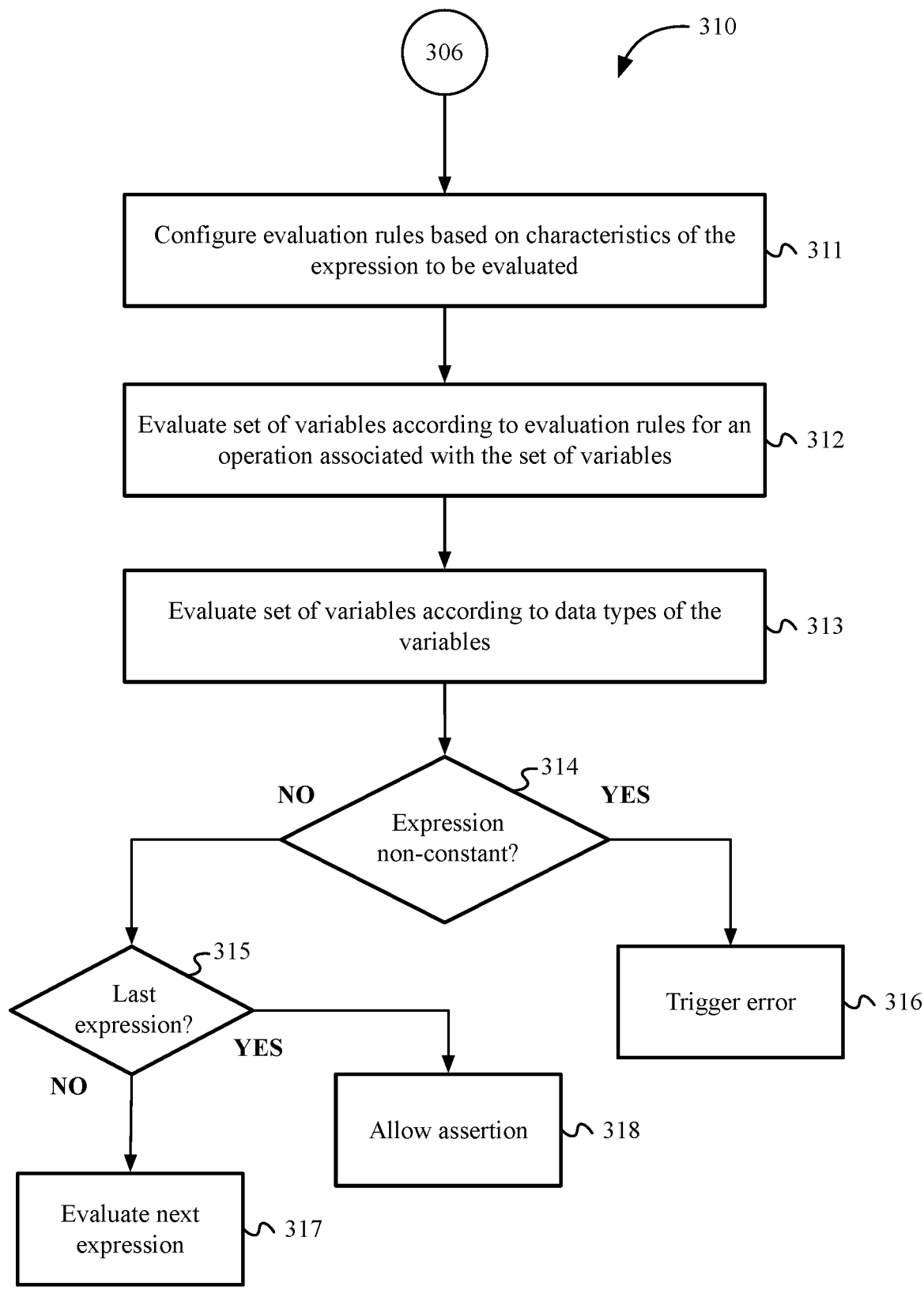

FIG. 3A-3B illustrate methods 300, 310 that can be used to evaluate the static provability of an assertion. FIG. 3A illustrates a method 300 determining the provability of an assertion statement using an abstract syntax tree. FIG. 3B illustrates a method 310 of using expression specific rules to evaluate portions of an assertion.

As shown in FIG. 3A, method 300 includes operation 301, which converts an intermediate representation of an assertion into an abstract syntax tree. Method 300 additionally includes operation 302, which performs a depth-first search on the abstract syntax tree to locate a non-constant expression. Method 300 then proceeds to operation 303, which includes, during the depth-first search, to traverse through to a leaf of the abstract syntax tree. Method 300 then proceeds to operation 304. If method 300 determines that the leaf has a constant value at compile-time at operation 304, method 300 then performs operation 308, which proceeds to the next leaf. If method 300 determines that the leaf is non-constant at operation 304, method 300 proceeds to operation 305 to determine if the Boolean truth of an expression to be evaluated is determinable with a variable value. Where the truth cannot be determined with a variable value, based on the expression to be evaluated, method 300 proceeds to operation 205 of method 200, which triggers a processing error. Where operation 305 determines that the Boolean truth of the expression is determinable with a variable value, method 300 proceeds to operation 306, which evaluates the expression based on characteristics of the expression. Characteristics of the expression include mathematical or logical characteristics associated with details of the expression, where those details include but are not limited to the operation performed by the expression and the data type of the variables within the expression and/or inputs to the expression.

As shown in FIG. 3B, method 310 includes operation 311, which can be performed in association with operation 306 of method 300. Operation 311 includes to configure evaluation rules based on characteristics of the expression to be evaluated. The evaluation rules can be configured based on mathematical or logical characteristics of rules associated with the expression. In one embodiment the characteristics include the operations associated with an expression, the data type of the variables within the expression, and mathematical and/or logical rules or constraints associated with the operations or data types within the expression. Based on the configured evaluation rules, operation 312 and 313 can be performed. Operation 312 includes evaluating variables within the expression according to evaluation rules for an operation associated with the set of variables. Operation 313 includes evaluating variables within the expression according to the data types of the variables.

During operation 312, variable inputs of a given expression of a condition can be evaluated based on mathematical or logical rules associated with the operation. For example, for a multiplication operation, it can be determined that if one input is known to be zero, the output will be zero without regard to the other inputs. Additionally, multiplying any number by itself will result in either zero or a positive value. The output of some logical operations can also be determined even if one or more inputs are unknown. For a logical OR operation, if it can be determined that one input is true, then the output of the expression will be true without regard to other inputs. For a logic AND operation, if it can be determined that one input is false, then the output of the expression will be false, without regard to the other inputs. In one embodiment, method 310 can perform operation 312 in association with depth-first search of an abstract syntax tree generated based on the assertion expression. In such embodiment, method 310 can determine the operation or operations to be performed within an expression before traversing to the portion of the abstract syntax tree that includes the inputs to the expression. Method 310 can then dynamically configure the evaluation rules for the inputs based on the expression and evaluate the inputs once the inputs are read from the abstract syntax tree.

During operation 313, variable inputs of a given expression of a condition can be evaluated based on the data type of each variable, as some data types can only hold a limited set of values. Depending on the number of bits associated with a data type of a variable, the minimum and maximum number that can be represented by the variable is known. Additionally, unsigned integer variables cannot natively store negative values.

Based on operation 312 and operation 313, method 310 may be able to determine if the expression to be evaluated is provably non-constant during operation 314. If the expression is non-constant, method 310 proceeds to operation 316, which triggers an error. The error can be displayed via a user interface of an IDE and can identify the specific expression of the condition that has a value that cannot be statically determined. If the expression is determined to be constant (e.g., not non-constant) at operation 314, method 310 can proceed to operation 315, to determine if the evaluated expression is the last expression of the condition for the assertion. If the evaluated expression is not the last expression, method 310 proceeds to operation 317, which evaluates the next expression in the condition. Once all expressions of a condition have been determined to be constant or constrained to the point that the expression can be evaluated in the context of the overall Boolean condition, method 310 proceeds to operation 318, which allows the assertion statement.

Embodiments described herein primarily focus on determining whether the Boolean value associated with assertion statement can be statically proven at compile-time. In one embodiment, a further evaluation can be performed to specifically determine that the assertion statement can be statically proven to be true at compile-time. In one embodiment, an error can be triggered if the statement associated with an assertion statement can be statically proven, but is statically proven to be false, as an assertion statement that is provably false is almost certain to be unintended by the developer.

Figure 4A:
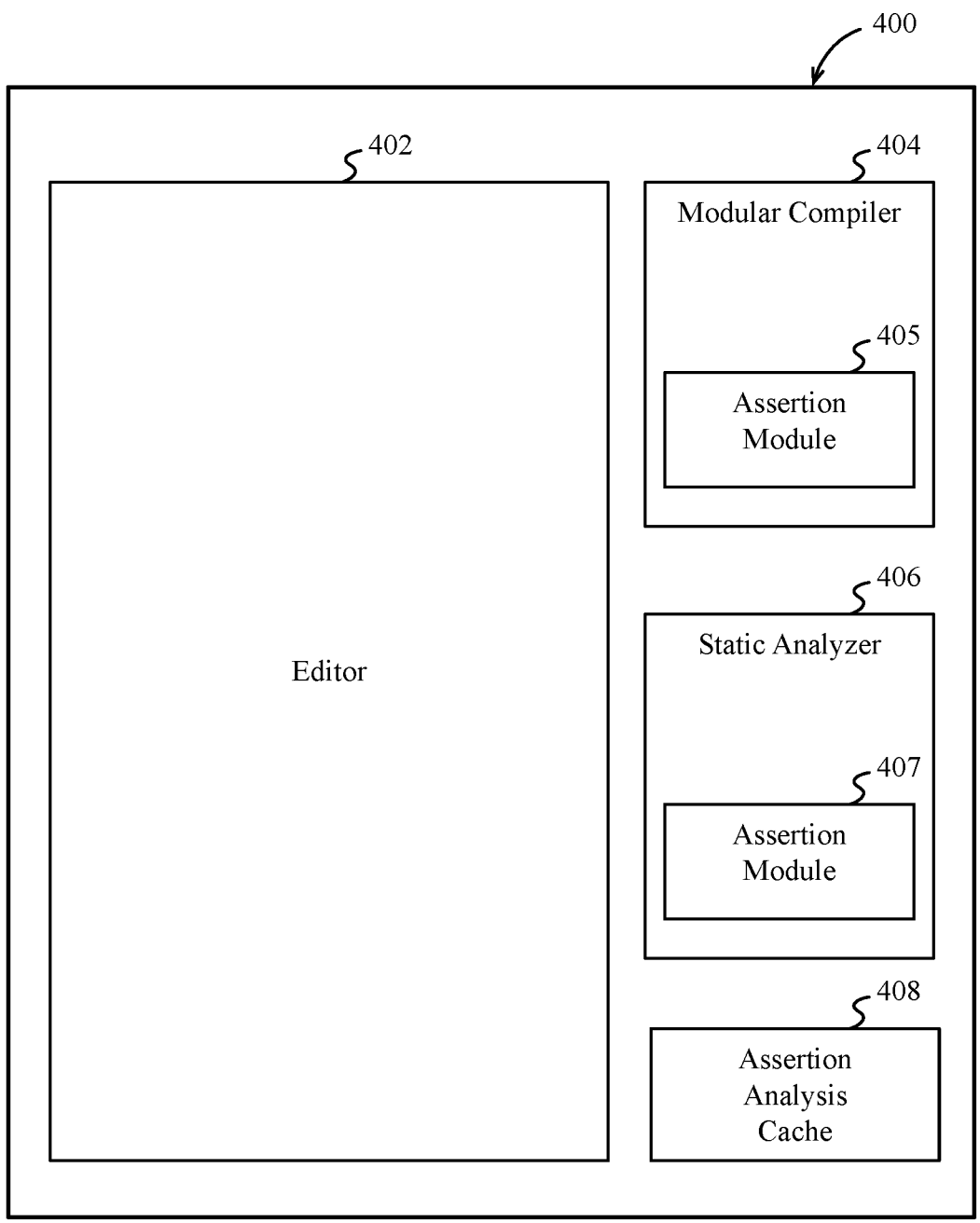
FIG. 4A-4B illustrate an IDE and software system to evaluate assertion statements using methods provided by embodiments described herein.
Figure 4B:
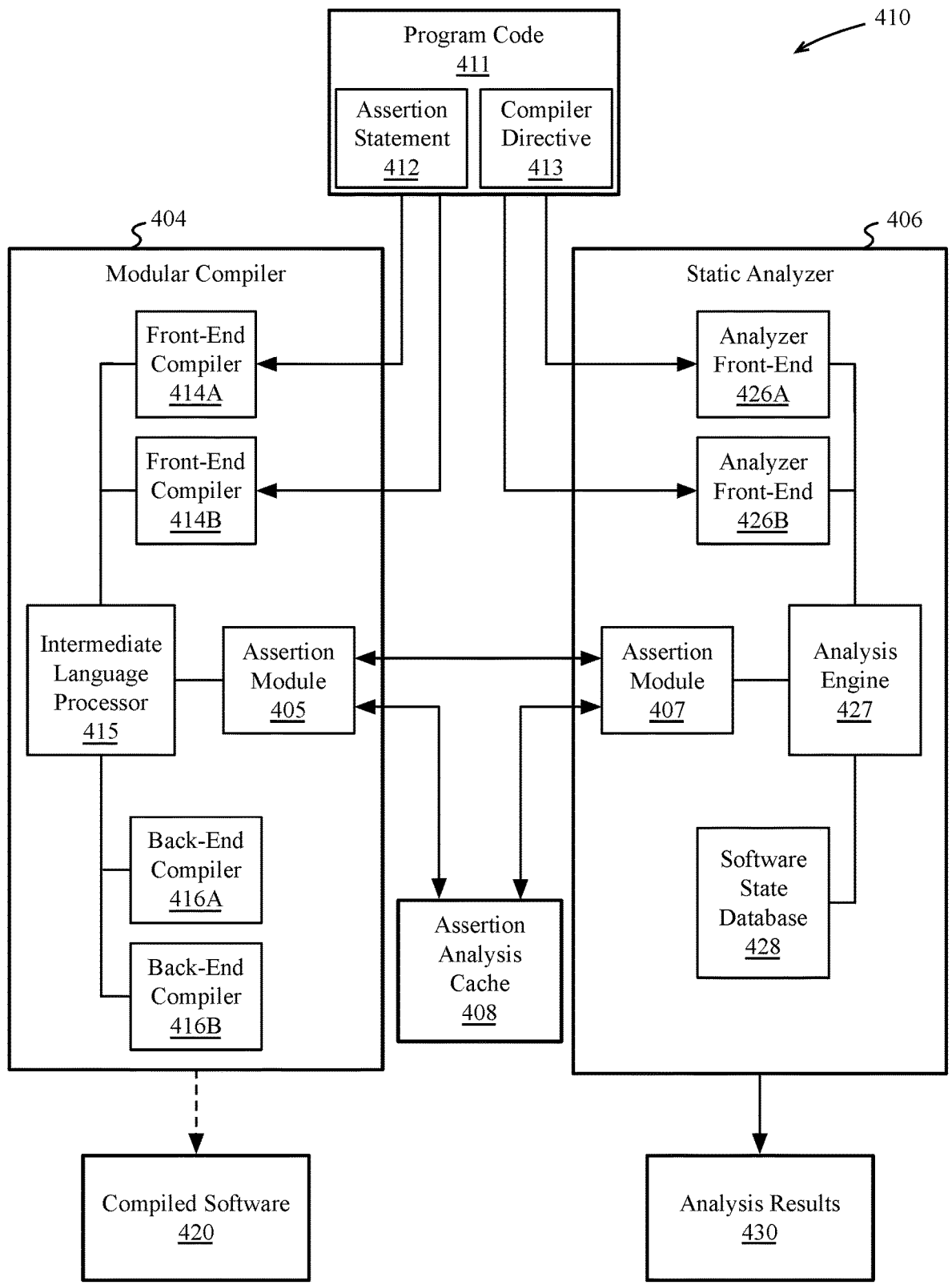

FIG. 4A-4B illustrate an IDE 400 and a system 410 to evaluate assertion statements using methods provided by embodiments described herein. FIG. 4A illustrates an IDE 400 (integrated development environment) including assertion analysis logic. FIG. 4B illustrates a system 410 associated with the IDE 400 in which a compiler and analyzer can cooperate to analyze assertion statements within program code.

As shown in FIG. 4A, one embodiment provides an IDE 400 having an editor 402, a modular compiler 404, a static analyzer 406, and an assertion analysis cache 408. The modular compiler 404 includes an assertion module 405 that performs compile-time analysis of assertion statement for program code compiled by the IDE 400. The static analyzer 406 also includes an assertion module 407 that can be used to analyze assertion statements during static analysis of program code edited within the IDE 400. Analyzed assertion statements, or portions of assertion statements, can be stored in the assertion analysis cache 408 by either of the assertion module 405 of the modular compiler 404 or the assertion module 407 of the static analyzer 406. Further operational details are illustrated by the system 410 of FIG. 4B.

In one embodiment the IDE 400 includes a system 410 as shown in FIG. 4B. The system 410 includes software modules executable by processing logic described herein to analyze program code 411 that includes an assertion statement 412. The assertion statement 412 can be detected within the program code 411 by the modular compiler 404 during compilation of the program code 411 or during analysis of the program code by the static analyzer 406. The static analyzer 406 can analyze the program code independently or in conjunction with compilation by the modular compiler 404.

In one embodiment, the system 410 provides support for program code 411 that is written in multiple programming languages. In such embodiment the modular compiler 404 includes multiple front-end compilers 414A-414B, which can be configured to perform front-end compilation for the multiple programming languages of the program code 411, where front-end compiler 414A compiles program code written in a first programming language, while front-end compiler 414B compiles program code written in a second programming language. Likewise, the static analyzer 406 can include analyzer front end 426A, which is configured to analyze the first programming language, and analyzer front end 426B, which is configured to analyze a second programming language.

For the modular compiler 404, the front-end compilers 414A-414B can convert the program code 411 to an intermediate language that is processed by an intermediate language processor 415. The intermediate language processor 415 can communicate with the assertion module 405, which is configured to analyze intermediate language representations of assertion statements 412 within the program code 411. As the assertion module 405 is configured to analyze intermediate representations of assertion statements 412, the assertion module can process assertion statements written in multiple programming languages. Likewise, the static analyzer 406 includes an analysis engine 427 coupled with an assertion module 407. The analysis engine 427 can be configured to analyze an intermediate representation of the program code 411, allowing multiple languages to be analyzed. The assertion module 407 can statically analyze an intermediate representation of assertion statement 412, which can be written in one of multiple languages.

In one embodiment the assertion module 405 of the modular compiler 404 is configured to analyze assertion statements within specific modules or blocks or the program code 411 during compilation, while the assertion module 407 of the static analyzer 406 can be configured to perform analysis across multiple modules of the program code 411. Furthermore, the assertion module 407 may be able to perform a more in-depth analysis of each assertion statement. For example, the analysis engine 427 of the static analyzer 406 can be configured as a source code simulator that traces multiple possible paths of execution. The simulation state of the program code 411, including multiple possible values of variables and expressions within the program code 411, can be stored within a software state database 428. In one embodiment the analysis engine 427 can generate a potential control flow graph of the program code 411, which can be used to analyze the potential paths of execution through the program code. The control flow graph can be used to perform operations such as a reachability analysis, to determine which portions of the program code may be executed through the multiple potential execution paths. Thus, in one embodiment, the analysis engine 427 can enable the assertion module 407 to perform a more thorough analysis of assertion statements within the program code, potentially at the expense of taking a longer amount of time to perform static analysis than the modular compiler 404 takes to compile the program code 411.

In one embodiment, the assertion module 405 of the modular compiler 404 can work in concert with the assertion module 407 of the static analyzer. For example, the assertion module 405 can analyze an assertion statement 412 that has a condition and expressions that are limited to a single program code module (e.g., file, library, etc.), while the assertion module 407 can analyze an assertion statement 412 that has a condition or expressions that are based on input or variables that span multiple modules of the program code 411.

In some embodiments, assertion module 405 and assertion module 407 can directly share information via shared memory buffers or inter-process communication messages. In some embodiments, the assertion module 405 and assertion module 407 can each store completed analysis for assertion conditions or expressions within the assertion analysis cache. The completed assertion analysis can be indexed in the assertion analysis cache 408 based on a symbol associated with the assertion statement or via a hash value that is generated based on the assertion statement or expressions of the condition of the assertion statement. In one embodiment, the analysis results for constituent expressions of an assertion condition can be indexed and stored separately, such that subsequent analysis of those same expressions can be bypassed and the analysis result can be loaded from the assertion analysis cache 408 by assertion module 405 and/or assertion module 407.

In one embodiment, if the assertion module 405 determines that all assertion statements 412 in the program code 411 are statically provable, one or more back end compilers 416A-416B can output compiled software 420 for one or more target platforms. If the assertion module 405 does not approve of all of the assertion statements, an error will be generated and displayed via the user interface of the IDE and compiled software 420 will not be generated. However, the static analyzer 406 may generate analysis results 430 that indicate whether each assertion statement 412 within the program code has been statically proven and can detail provability failures for multiple assertion statements 412 if multiple statements fail provability analysis. In one embodiment, the assertion module 405 of the modular compiler 404 can be configured to re-use the analysis of one or more assertion statements 412 that are contained within the analysis results 430 if the program code 411 has not been changed between the generation of the analysis results 430 and the compilation of the program code 411 by the modular compiler 404.

In one embodiment, for example, where the program code 411 includes an assertion statement 412 that is a cross-module assertion statement that cannot be fully analyzed by the modular compiler 404, and where the static analyzer 406 is not in use, it may be possible for a programmer to include a compiler directive 413 within the program code that explicitly assigns a value to a variable or expression, where the truth of such expression cannot be explicitly determined by the modular compiler 404. During compilation, the assertion module 405 will assume the truth of statements provided by a compiler directive 413. An example of the use of a compiler directive is shown in Table 1 below.

TABLE 1

| Compiler Directive | |
|---|---|
| 01 | #pragma assert (x > 0) |
| 02 | func (param x) { |
| 03 | Y = x * x |

TABLE 1-continued

| Compiler Directive | |
|---|---|
| 04 | assert (Y > 0) |
| 05 | } |

As shown in Table 1, an exemplary compiler directive on line 01 (#pragma assert (x>0)) can be used by a programmer to statically assert the truth of an expression. In one embodiment the directive asserted statement has local scope and, for example, may be limited to the program code file or module in which the directive is found. By using a directive to assert that the value of parameter x will always be greater than zero, the assertion module 405, 407 will determine that the statement assert (Y>0) is statically provable, as Y=x*x.

In one embodiment, the compiler directive 413 can be replaced with an Assertion and Verification paradigm in which assertion statements are used to explicitly state the truth of certain conditions or variables and verification statements are used in place of the traditional assertion statement. For example, a programmer can assert that an expression or variable has a value and the assertion module 405, 407 of the modular compiler 404 or static analyzer 406 will assume the truth of the asserted statement when processing the static provability of a later verify statement. An example of assertion and verification is shown in Table 2 below.

TABLE 2

| Assert and Verify | |
|---|---|
| 01 | func (param x) { |
| 02 | assert (x > 0) |
| 03 | Y = x * x |
| 04 | verify (Y > 0) |
| 05 | } |

As shown in Table 2, in one embodiment the verify statement of line 04 is used as a global replacement of the assertion statement generally described herein. The assertion statement of line 02 can then be used to provide an expression that will be assumed to be true when verifying the static provability of a subsequent verify statement. In one embodiment, the assert and verify statements are processed such that the statements must be within the same scope, although not all embodiments are limited as such.

Figure 5:
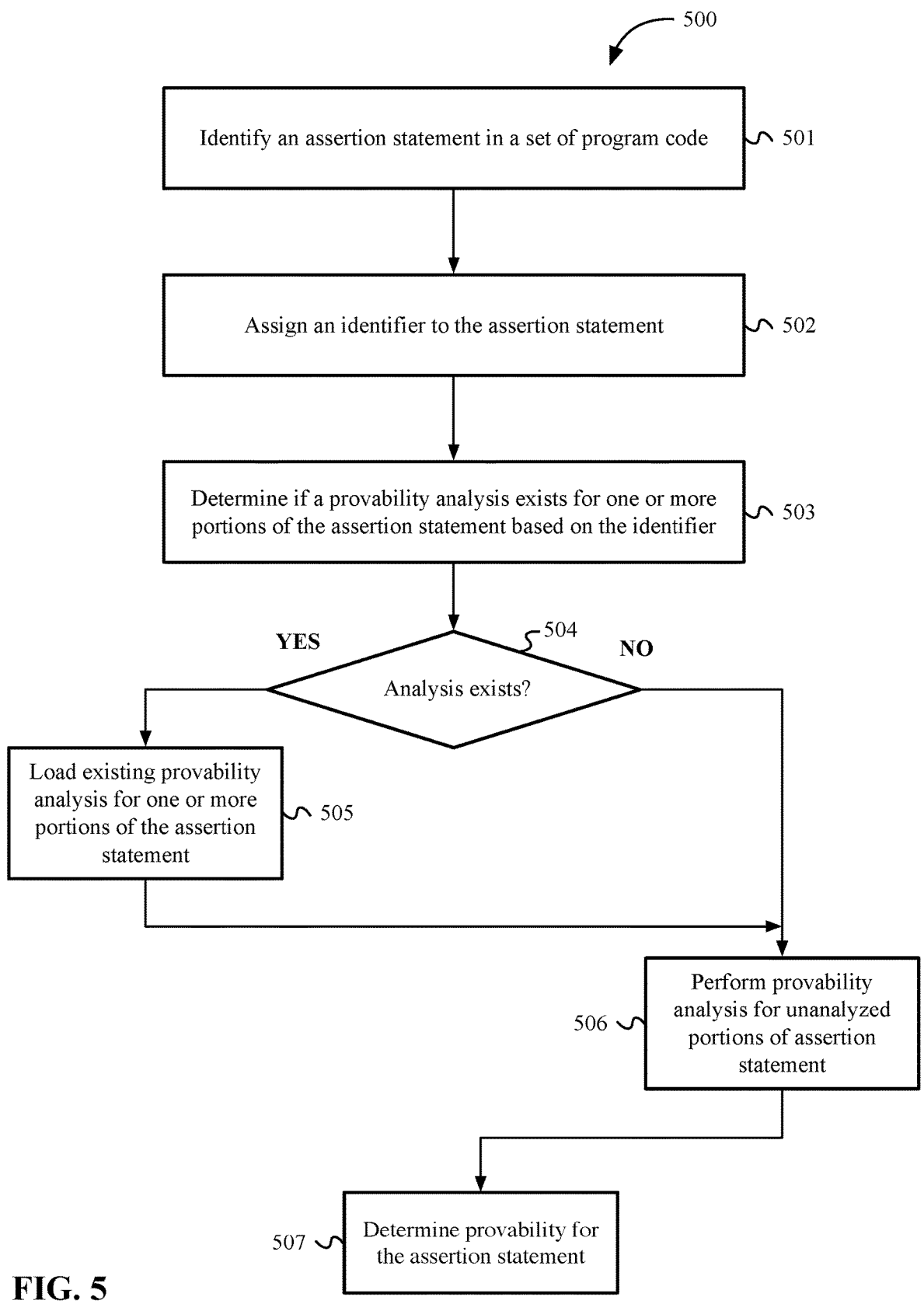
FIG. 5 illustrates a method to use cached assertion analysis during provability analysis of an assertion statement, according to an embodiment.

FIG. 5 illustrates a method 500 to use cached assertion analysis during provability analysis of an assertion statement, according to an embodiment. Method 500 can be implemented by a modular compiler or static analyzer as described herein, such as the modular compiler 404 and static analyzer 406 of FIG. 4A-4B.

In one embodiment, method 500 includes operation 501, which identifies an assertion statement in a set of program code. Method 500 can then proceed to operation 502, to assign an identifier to the assertion statement. Method 500 can then perform operation 503, which determines if a provability analysis exists for one or more portions of the assertion statement based on the identifier. The identifier assigned by operation 502 can be a symbol associated with the assertion statement, a hash value generated based on the assertion statement, or a collection of hash values or symbols for the various constituent expressions of the condition asserted by the assertion statement.

Method 500 includes operation 504, which determines whether a previous analysis exists. The previous analysis can be analysis that is cached within an analysis assertion cache or provided by a cooperating assertion module of a modular compiler or static analyzer. In one embodiment the previous analysis can be derived from analysis results output by a static analyzer. In one embodiment, the previous analysis can be provided by a compiler directive within program code. In one embodiment, where an Assertion and Verification paradigm is in place, the previous analysis for a verification statement can be based on an assertion statement, at least a portion which is being verified by a verify statement.

If operation 504 determines that a previous analysis exists, method 500 can proceed to operation 505, which loads the existing provability analysis for one or more portions of the assertion statement. The loaded provability analysis can be for the entire condition of the assertion of for one or more expressions that are evaluated during the evaluation of the condition of the assertion statement. After operation 505, method 500 can proceed to operation 506, which performs provability analysis for any unanalyzed portions of the assertion statement. If previous results exist for the entire condition of the assertion statement, operation 506 can be bypassed. After operation 506 is bypassed or performed, method 500 can proceed to operation 507 to determine provability for the assertion statement based on current or previous analysis of the various portions of the condition of the assertion statement.

In one embodiment, where previous analysis is used, the previous analysis is valid only if the program code does not change. If any changes are made to the program code, the assertion analysis cache may be flushed. In one embodiment, the assertion analysis cache is flushed at the beginning of every compilation or analysis cycle even if the program code has not changed.

Figure 6:
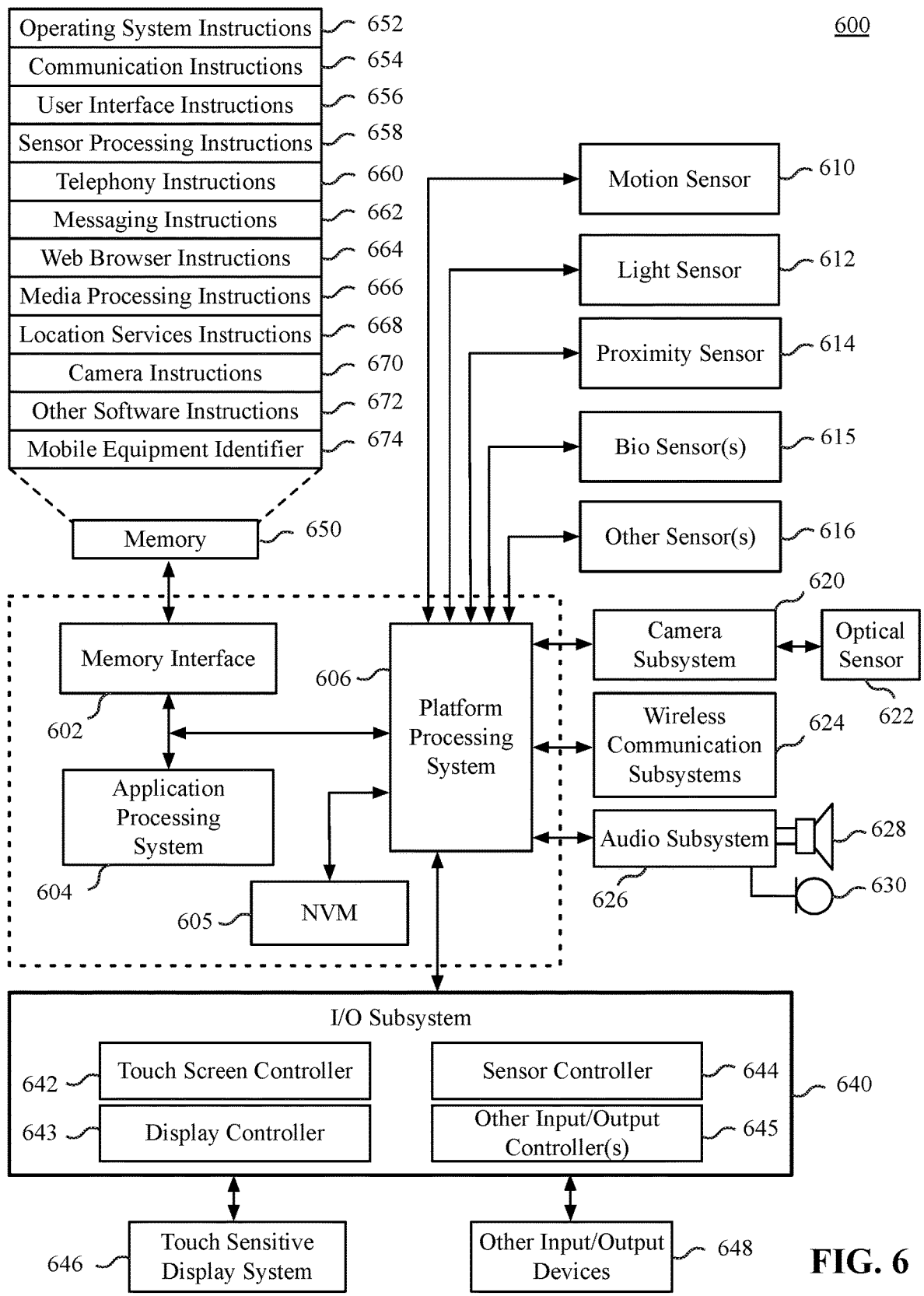
FIG. 6 is a block diagram of mobile device architecture, according to embodiments described herein.

FIG. 6 is a block diagram of a computing device architecture 600, according to an embodiment. The computing device architecture 600 includes a memory interface 602, a processing system 604, and a platform processing system 606. The various components can be coupled by one or more communication buses, fabrics, or signal lines. The various components can be separate logical components or devices or can be integrated in one or more integrated circuits, such as in a system on a chip integrated circuit. The processing system 604 may include multiple processors and/or co-processors. The various processors within the processing system 604 can be similar in architecture or the processing system 604 can be a heterogeneous processing system including processors that differ in instruction set architecture or microarchitecture. In one embodiment, the processing system 604 is a heterogeneous processing system including one or more data processors, image processors, audio processors, graphics processing units, or neural net processors.

The memory interface 602 can be coupled to memory 650, which can include high-speed random-access memory such as static random-access memory (SRAM) or dynamic random-access memory (DRAM). The memory can store runtime information, data, and/or instructions are persistently stored in non-volatile memory 605, such as but not limited to flash memory (e.g., NAND flash, NOR flash, etc.). Additionally, at least a portion of the memory 650 is non-volatile memory. The connection between the processing system 604 and memory interface 602 to the non-volatile memory 605 can be facilitated via the platform processing system 606.

Sensors, devices, and subsystems can be coupled to the platform processing system 606 to facilitate multiple functionalities. For example, a motion sensor 610, a light sensor 612, and a proximity sensor 614 can be coupled to the platform processing system 606 to facilitate the mobile device functionality. Other sensors 616 can also be connected to the platform processing system 606, such as a positioning system (e.g., GPS receiver), a temperature sensor, a biometric sensor, or other sensing device, to facilitate related functionalities. A camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

In one embodiment, the platform processing system 606 can enable a connection to communication peripherals including one or more wireless communication subsystems 624, which can include radio frequency receivers and transmitters and/or optical (e.g., infrared) receivers and transmitters. The specific design and implementation of the wireless communication subsystems 624 can depend on the communication network(s) over which a mobile device is intended to operate. For example, a mobile device including the illustrated computing device architecture 600 can include wireless communication subsystems 624 designed to operate over a network using Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol, including 5G network protocols.

The wireless communication subsystems 624 can provide a communications mechanism over which a client browser application can retrieve resources from a remote web server. The platform processing system 606 can also enable an interconnect to an audio subsystem 626, which can be coupled to a speaker 628 and a microphone 630 to facilitate voice-enabled functions, such as voice recognition, voice replication, digital recording, and telephony functions.

The platform processing system 606 can enable a connection to an I/O subsystem 640 that includes a touch screen controller 642 and/or other input controller(s) 645. The touch screen controller 642 can be coupled to a touch sensitive display system 646 (e.g., touch screen). The touch sensitive display system 646 and touch screen controller 642 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 646. Display output for the touch sensitive display system 646 can be generated by a display controller 643. In one embodiment, the display controller 643 can provide frame data to the touch sensitive display system 646 at a variable frame rate.

In one embodiment, a sensor controller 644 is included to monitor, control, and/or processes data received from one or more of the motion sensor 610, light sensor 612, proximity sensor 614, or other sensors 616. The sensor controller 644 can include logic to interpret sensor data to determine the occurrence of one of more motion events or activities by analysis of the sensor data from the sensors.

In one embodiment, the platform processing system 606 can also enable a connection to one or more bio sensor(s) 615. A bio sensor can be configured to detect biometric data for a user of computing device. Biometric data may be data that at least quasi-uniquely identifies the user among other humans based on the user's physical or behavioral characteristics. For example, in some embodiments the bio sensor(s) 615 can include a finger print sensor that captures fingerprint data from the user. In another embodiment, bio sensor(s) 615 include a camera that captures facial information from a user's face. In some embodiments, the bio sensor(s) 615 can maintain previously captured biometric data of an authorized user and compare the captured biometric data against newly received biometric data to authenticate a user.

In one embodiment, the I/O subsystem 640 includes other input controller(s) 645 that can be coupled to other input/control devices 648, such as one or more buttons, rocker switches, thumb-wheel, infrared port, USB port, and/or a pointer device such as a stylus, or control devices such as an up/down button for volume control of the speaker 628 and/or the microphone 630.

In one embodiment, the memory 650 coupled to the memory interface 602 can store instructions for an operating system 652, including portable operating system interface (POSIX) compliant and non-compliant operating system or an embedded operating system. The operating system 652 may include instructions for handling basic system services and for performing hardware dependent tasks. In some implementations, the operating system 652 can be a kernel or micro-kernel based operating system.

The memory 650 can also store communication instructions 654 to facilitate communicating with one or more additional devices, one or more computers and/or one or more servers, for example, to retrieve web resources from remote web servers. The memory 650 can also include user interface instructions 656, including graphical user interface instructions to facilitate graphic user interface processing.

Additionally, the memory 650 can store sensor processing instructions 658 to facilitate sensor-related processing and functions; telephony instructions 660 to facilitate telephone-related processes and functions; messaging instructions 662 to facilitate electronic-messaging related processes and functions; web browser instructions 664 to facilitate web browsing-related processes and functions; media processing instructions 666 to facilitate media processing-related processes and functions; location services instructions including GPS and/or navigation instructions 668 and Wi-Fi based location instructions to facilitate location based functionality; camera instructions 670 to facilitate camera-related processes and functions; and/or other software instructions 672 to facilitate other processes and functions, e.g., security processes and functions, and processes and functions related to the systems. The memory 650 may also store other software instructions such as web video instructions to facilitate web video-related processes and functions; and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. A mobile equipment identifier, such as an International Mobile Equipment Identity (IMEI) 674 or a similar hardware identifier can also be stored in memory 650.

Each of the above identified instructions and applications can correspond to a set of instructions for performing one or more functions described above. These instructions need not be implemented as separate software programs, procedures, or modules. The memory 650 can include additional instructions or fewer instructions. Furthermore, various functions may be implemented in hardware and/or in software, including in one or more signal processing and/or application specific integrated circuits.

Figure 7:
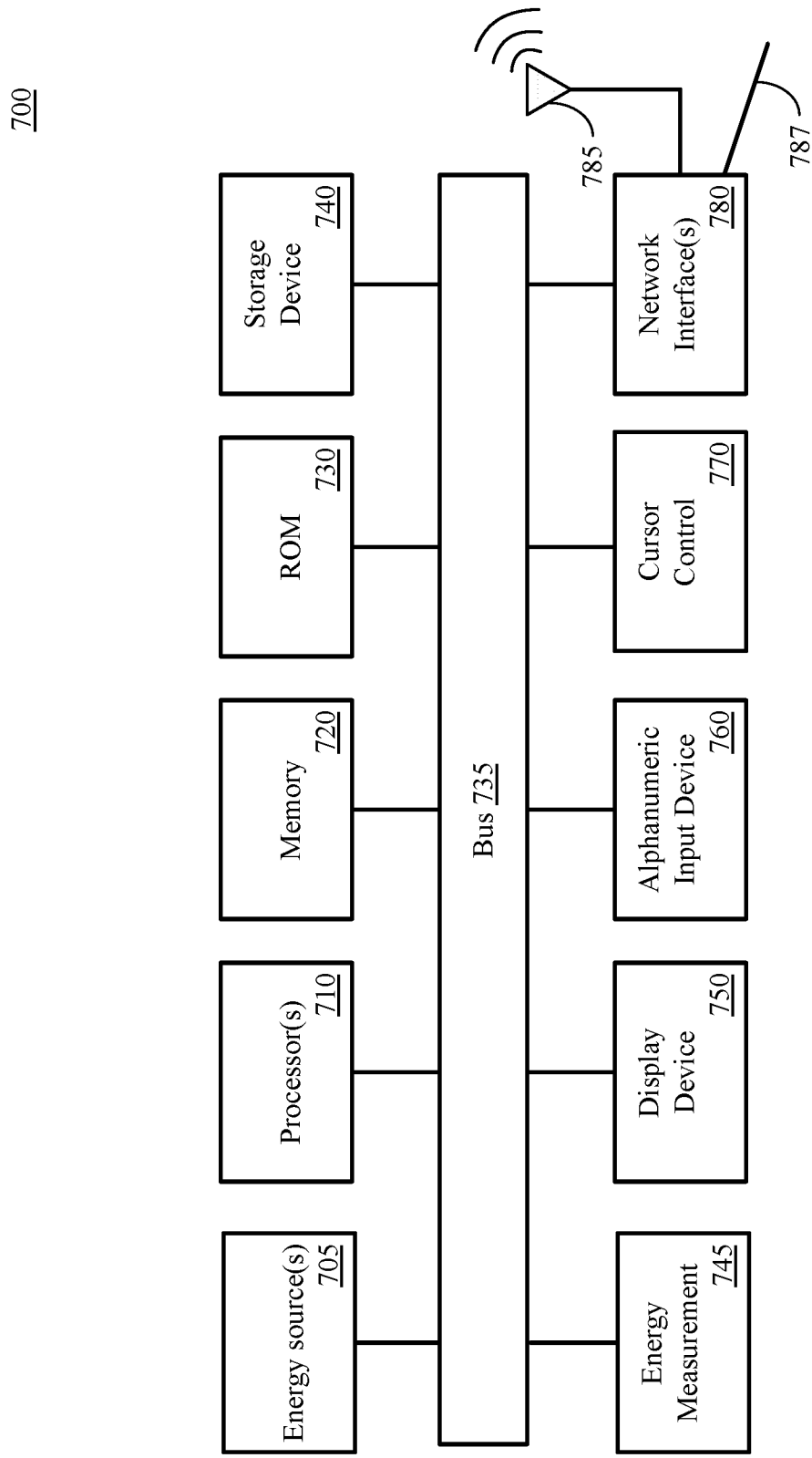
FIG. 7 is a block diagram of one embodiment of a computing system, according to embodiments described herein.

FIG. 7 is a block diagram of a computing system 700, according to an embodiment. The illustrated computing system 700 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 700 can be used to provide the computing device and/or a server device to which the computing device may connect.

The computing system 700 includes bus 735 or other communication device to communicate information, and processor(s) 710 coupled to bus 735 that may process information. While the computing system 700 is illustrated with a single processor, the computing system 700 may include multiple processors and/or co-processors. The computing system 700 further includes memory 720, which may be random access memory (RAM) or other dynamic data storage device coupled to the bus 735. The memory 720 may store information and instructions that may be executed by processor(s) 710. Memory 720 may also be main memory that is used to store temporary variables or other intermediate information during execution of instructions by the processor(s) 710.

The computing system 700 may also include read only memory (ROM) 730 and/or another data storage device 740 coupled to the bus 735 that may store information and instructions for the processor(s) 710. The data storage device 740 can be or include a variety of storage devices, such as a flash memory device, a magnetic disk, or an optical disc and may be coupled to computing system 700 via the bus 735 or via a remote peripheral interface.

The computing system 700 may also be coupled, via the bus 735, to a display device 750 to display information to a user. The computing system 700 can also include an alphanumeric input device 760, including alphanumeric and other keys, which may be coupled to bus 735 to communicate information and command selections to processor(s) 710. Another type of user input device includes a cursor control 770 device, such as a touchpad, a mouse, a trackball, or cursor direction keys to communicate direction information and command selections to processor(s) 710 and to control cursor movement on the display device 750. The computing system 700 may also receive user input from a remote device that is communicatively coupled via one or more network interface(s) 780.

The computing system 700 further may include one or more network interface(s) 780 to provide access to a network, such as a local area network. The network interface(s) 780 may include, for example, a wireless network interface having antenna 785, which may represent one or more antenna(e). The computing system 700 can include multiple wireless network interfaces such as a combination of Wi-Fi, Bluetooth®, near field communication (NFC), and/or cellular telephony interfaces. The network interface(s) 780 may also include, for example, a wired network interface to communicate with remote devices via network cable 787, which may be, for example, an Ethernet cable, a coaxial cable, a fiber optic cable, a serial cable, or a parallel cable.

In one embodiment, the network interface(s) 780 may provide access to a local area network, for example, by conforming to IEEE 802.11 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 780 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 700 can further include one or more energy sources 705 and one or more energy measurement systems 745. Energy sources 705 can include an AC/DC adapter coupled to an external power source, one or more batteries, one or more charge storage devices, a USB charger, or other energy source. Energy measurement systems include at least one voltage or amperage measuring device that can measure energy consumed by the computing system 700 during a predetermined period of time. Additionally, one or more energy measurement systems can be included that measure, e.g., energy consumed by a display device, cooling subsystem, Wi-Fi subsystem, or other frequently used or high-energy consumption subsystem.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used herein is for the purpose of describing particular embodiments only and is not intended to be limiting as to all embodiments. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In addition, the hardware-accelerated engines/functions are contemplated to include any implementations in hardware, firmware, or combination thereof, including various configurations which can include hardware/firmware integrated into the SoC as a separate processor, or included as special purpose CPU (or core), or integrated in a coprocessor on the circuit board, or contained on a chip of an extension circuit board, etc.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Embodiments described herein provide an integrated development environment that includes a compiler and analyzer toolchain that evaluates assertion statements within program code. Assertion statements assert the truth of a Boolean condition, which may be a simple value or expression or may be a Boolean-logic composition of multiple values or expressions. The toolchain of the integrated development environment is configured to determine if the asserted condition of the assertion statement is statically provable at compile-time. A condition is statically provable if and only if every element of a composition of multiple values can be resolved to a constant value at compile-time, or the set of potential values of any non-constant values or expression within the condition can be determined to be sufficiently constrained.

One embodiment provides for a non-transitory machine-readable medium storing instructions to cause one or more processors to perform operations processing, in an integrated development environment, a set of program code to identify an assertion within the set of program code, determining compile-time provability of a condition specified by the assertion, and presenting an error condition in response to failing to determine compile-time provability of the condition specified by the assertion. Determining compile-time provability of the condition specified by the assertion includes semantically converting the condition specified by the assertion into a Boolean, reducing the Boolean to an intermediate representation, and processing the intermediate representation to detect an expression within the intermediate representation that is non-constant at compile-time. Failing to determine compile-time provability of the condition specified by the assertion includes detecting an expression within the intermediate representation that is non-constant at compile-time. In a further embodiment, failing to determine compile-time provability of the condition specified by the assertion additionally includes, in response to detecting an expression within the intermediate representation that is non-constant at compile-time, analyzing the expression based on evaluation rules configured based on a logical or mathematical characteristic of the expression and failing to determine a constraint on an output value of the expression that enables determination of compile-time provability of the condition specified by the assertion. If the output value of the expression can be sufficiently constrained to allow the overall condition of the assertion statement to be proven, the assertion statement will not trigger an error message. Compilation or analysis can then proceed to other statement.

In one embodiment the intermediate representation is an abstract syntax graph and the operations additionally include traversing the abstract syntax graph until detection of the value that is non-constant at compile-time. Traversing the abstract syntax graph can include performing a depth-first search to traverse the abstract syntax graph until a terminal graph node is discovered that is non-constant at compile-time, although other graph traversal methods can be used in other embodiments. Traversal of the abstract syntax graph can be immediately terminated in response to discovery of a non-constant terminal graph node, or the non-constant node can be further evaluated based on configured evaluation rules.

In one embodiment, the operations additionally comprise determining compile-time provability of the condition specified by the assertion, the condition associated with a symbol that is at least quasi-unique to the set of program code, storing a provability result and the symbol in a condition cache, and reading the provability result from the condition cache during a subsequent verification of the symbol. The condition cache can include a list of previously evaluated graph traversals that have been found statically provably at compile-time. In one embodiment, the operations additionally comprise receiving a specified truth value for a predicate associated with a condition specified by the assertion and determining compile-time provability of the condition based on the specified truth value. The truth value can be a locally-scoped compiler directive (e.g., pragma) or can be received from a static analyzer module. In one embodiment, the truth value is included within program code that specifies a condition or expression that is to be assumed to be true upon subsequent evaluation of a program code statement that includes the specified condition or expression.

One embodiment provides for a data processing system comprising a memory to store instructions for processing and one or more processors to execute the instructions. The instructions, when executed, cause the data processing system to perform operations comprising processing, in an integrated development environment, a set of program code to identify an assertion within the set of program code, determining compile-time provability of a condition specified by the assertion, and presenting an error condition in response to failing to determine compile-time provability of the condition specified by the assertion, wherein determining compile-time provability of the condition specified by the assertion includes semantically converting the condition specified by the assertion into a Boolean, reducing the Boolean to an intermediate representation, and processing the intermediate representation to detect an expression within the intermediate representation that is non-constant at compile-time.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A non-transitory machine-readable medium storing instructions to cause one or more processors to perform operations comprising:

processing, in an integrated development environment, a set of program code to identify an assertion within the set of program code;

determining compile-time provability of a condition specified by the assertion, wherein determining the compile-time provability of the condition specified by the assertion includes semantically converting the condition specified by the assertion into a Boolean, reducing the Boolean to an intermediate representation, and processing the intermediate representation to verify that an evaluation chain for the condition is Boolean constant at compile-time; and presenting an error condition in response to failing to determine the compile-time provability of the condition specified by the assertion, wherein failing to determine the compile-time provability of the condition specified by the assertion includes:

detecting an expression that is Boolean non-constant at the compile-time, the expression being within the intermediate representation associated with the condition specified by the assertion within the set of program code;

analyzing the expression based on evaluation rules configured based on a logical or mathematical characteristic of the expression;

determining whether an output value of the expression is constrained or unconstrained to determine the compile-time provability of the condition specified by the assertion; and failing to determine that the output value of the expression is constrained.

2. The non-transitory machine-readable medium as in claim 1, wherein failing to determine the compile-time provability of the condition specified by the assertion includes detecting another expression within the intermediate representation of the evaluation chain for the condition that is Boolean non-constant at the compile-time.

3. The non-transitory machine-readable medium as in claim 1, wherein the intermediate representation is an abstract syntax graph and the operations additionally include traversing the abstract syntax graph until detection of a value that is non-constant at the compile-time.

4. The non-transitory machine-readable medium as in claim 3, wherein traversing the abstract syntax graph includes performing a depth-first search to traverse the abstract syntax graph until a terminal graph node is discovered that is non-constant at the compile-time.

5. The non-transitory machine-readable medium as in claim 4, the operations additionally comprising immediately terminating traversal of the abstract syntax graph in response to discovery of a non-constant terminal graph node.

6. The non-transitory machine-readable medium as in claim 1, the operations additionally comprising:

determining the compile-time provability of the condition specified by the assertion, the condition associated with a symbol that is unique within the set of program code;

storing a provability result and the symbol in a condition cache; and reading the provability result from the condition cache during a subsequent verification of the symbol, the provability result having previously been determined for the symbol.

7. The non-transitory machine-readable medium as in claim 6, wherein the condition cache includes a list of previously evaluated graph traversals that have been found statically provable at the compile-time.

8. The non-transitory machine-readable medium as in claim 1, the operations additionally comprising:
receiving a specified truth value for a predicate associated with a condition specified by the assertion; and
determining the compile-time provability of the condition based on the specified truth value.

9. The non-transitory machine-readable medium as in claim 8, wherein the specified truth value is specified via a locally-scoped compiler directive.

10. The non-transitory machine-readable medium as in claim 8, wherein the specified truth value is received from a static analyzer module.

11. The non-transitory machine-readable medium as in claim 1, wherein the instructions further cause the one or more processors to perform the operations comprising:
storing a compile-time provability result in a condition cache; and
flushing the condition cache in response to a change in the set of program code.

12. A data processing system comprising:
a memory to store instructions for processing; and
one or more processors to execute the instructions, wherein the instructions, when executed, cause the data processing system to perform operations comprising:
processing, in an integrated development environment, a set of program code to identify an assertion within the set of program code;
determining compile-time provability of a condition specified by the assertion, wherein determining the compile-time provability of the condition specified by the assertion includes semantically converting the condition specified by the assertion into a Boolean, reducing the Boolean to an intermediate representation, and processing the intermediate representation to verify that an evaluation chain for the condition is Boolean constant at compile-time, the evaluation chain including multiple values; and
presenting an error condition in response to failing to determine the compile-time provability of the condition specified by the assertion, wherein failing to determine the compile-time provability of the condition specified by the assertion includes:
detecting an expression that is Boolean non-constant at the compile-time, the expression being within the intermediate representation associated with the condition specified by the assertion within the set of program code;
analyzing the expression based on evaluation rules configured based on a logical or mathematical characteristic of the expression;
determining whether an output value of the expression is constrained or unconstrained to determine the compile-time provability of the condition specified by the assertion; and
failing to determine that the output value of the expression is constrained.

13. The data processing system as in claim 12, wherein failing to determine the compile-time provability of the condition specified by the assertion includes detecting another expression within the intermediate representation of the evaluation chain of the condition that is Boolean non-constant at the compile-time.

14. The data processing system as in claim 12, wherein the intermediate representation is an abstract syntax graph and the operations additionally include traversing the abstract syntax graph until detection of a value that is non-constant at the compile-time.

15. The data processing system as in claim 14, wherein traversing the abstract syntax graph includes performing a depth-first search to traverse the abstract syntax graph until a terminal graph node is discovered that is non-constant at the compile-time.

16. The data processing system as in claim 15, the operations additionally comprising immediately terminating traversal of the abstract syntax graph in response to discovery of a non-constant terminal graph node.

17. The data processing system as in claim 12, the operations additionally comprising:
determining the compile-time provability of the condition specified by the assertion, the condition associated with a symbol that is unique within the set of program code;
storing a provability result and the symbol in a condition cache; and
reading the provability result from the condition cache during a subsequent verification of the symbol, the provability result having previously been determined for the symbol, wherein the condition cache includes a list of previously evaluated graph traversals that have been found statically provable at the compile-time.

18. The data processing system as in claim 12, the operations additionally comprising:
receiving a specified truth value for a predicate associated with a condition specified by the assertion; and
determining the compile-time provability of the condition based on the specified truth value.

19. The data processing system as in claim 18, wherein the specified truth value is specified via a locally-scoped compiler directive or is received from a static analyzer module.

20. A method comprising:
on a computing device including one or more processors:
processing, in an integrated development environment, a set of program code to identify an assertion within the set of program code;
determining compile-time provability of a condition specified by the assertion, wherein determining the compile-time provability of the condition specified by the assertion includes semantically converting the condition specified by the assertion into a Boolean, reducing the Boolean to an intermediate representation, and processing the intermediate representation to verify that an evaluation chain for the condition is Boolean constant at compile-time; and
presenting an error condition in response to failing to determine the compile-time provability of the condition specified by the assertion, wherein failing to determine the compile-time provability of the condition specified by the assertion includes:
detecting an expression that is Boolean non-constant at the compile-time, the expression being within the intermediate representation associated with the condition specified by the assertion within the set of program code;
analyzing the expression based on evaluation rules configured based on a logical or mathematical characteristic of the expression;
determining whether an output value of the expression is constrained or unconstrained to determine the compile-time provability of the condition specified by the assertion; and
failing to determine that the output value of the expression is constrained.

21. The method as in claim 20, further comprising:
determining the compile-time provability of the condition specified by the assertion, the condition associated with a symbol that is unique within the set of program code;
storing a provability result and the symbol in a condition cache; and
reading the provability result from the condition cache during a subsequent verification of the symbol, the provability result having previously been determined for the symbol.

* * * * *